US012169575B2

(12) United States Patent
Decrop et al.

(10) Patent No.: US 12,169,575 B2
(45) Date of Patent: Dec. 17, 2024

(54) COMBINING A VIRTUAL REALITY INTERFACE WITH A SMART CONTACT LENS USER INTERFACE (71) Applicant: INTERNATIONAL BUSINESS MACHINES CORPORATION, Armonk, NY (US)

(72) Inventors: Clement Decrop, Arlington, VA (US); Jeremy R. Fox, Georgetown, TX (US); Tushar Agrawal, West Fargo, ND (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 17/471,807

(22) Filed: Sep. 10, 2021

(65) Prior Publication Data
US 2023/0079041 A1 Mar. 16, 2023

(51) Int. Cl.
*G06F 21/62* (2013.01)
*G02C 7/04* (2006.01)
*G02C 7/08* (2006.01)
*G06F 3/01* (2006.01)
*G06F 3/04817* (2022.01)
(Continued)

(52) U.S. Cl.
CPC .......... *G06F 21/6218* (2013.01); *G02C 7/04* (2013.01); *G02C 7/083* (2013.01); *G06F 3/011* (2013.01); *G06F 3/04817* (2013.01); *G06T 19/006* (2013.01); *H04L 63/102* (2013.01); *G06F 2221/2141* (2013.01)

(58) Field of Classification Search
CPC ................. G06F 3/011; G06F 3/04817; G06F 2221/2141; G06F 21/84
See application file for complete search history.

(56) References Cited

U.S. PATENT DOCUMENTS

| 5,682,210 A | 10/1997 | Weirich |
| 11,221,213 B2 * | 1/2022 | Abovitz ............... G01B 11/303 |
| 2016/0091737 A1 | 3/2016 | Km et al. |

(Continued)

FOREIGN PATENT DOCUMENTS

| WO | 2017173735 | 10/2017 |
| WO | 2018109570 | 6/2018 |

OTHER PUBLICATIONS

Anonymous, "AR/VR meets enterprise", http://IBM-design-language.eu-de.mybluemix.net/design/language/experience/vrar/, accessed Sep. 17, 2021, 4 pages.

(Continued)

*Primary Examiner* — Ellen Tran
(74) *Attorney, Agent, or Firm* — Daniel Yeates; Andrew D. Wright; Calderon Safran & Wright P.C.

(57) ABSTRACT

A method includes: receiving, by a computing device, user input to move content from an augmented reality (AR) interface to a virtual reality (VR) interface; obtaining, by the computing device, security levels of users in a VR environment associated with the VR interface; determining, by the computing device and based on the security levels, which of the users in the VR environment is permitted to see the content; and changing, by the computing device, at least one of the AR interface to the VR interface based on the determining.

20 Claims, 6 Drawing Sheets (51) Int. Cl.
  *G06T 19/00*  (2011.01)
  *H04L 9/40*  (2022.01)

(56) References Cited

U.S. PATENT DOCUMENTS

| | | |
|---|---|---|
| 2016/0267720 A1 | 9/2016 | Mandella et al. |
| 2019/0064526 A1 | 2/2019 | Connor |
| 2019/0107935 A1* | 4/2019 | Spivack ............. G06Q 30/0277 |
| 2019/0147655 A1* | 5/2019 | Galera .................... G06T 15/20 |
| | | 345/419 |
| 2019/0355176 A1 | 11/2019 | Evans |
| 2020/0241322 A1 | 7/2020 | Rakshit et al. |
| 2022/0327646 A1* | 10/2022 | Suzuki .................. A63F 13/213 |

OTHER PUBLICATIONS

Anonymous, "Method and system for creation of obstacle free augmented reality object from smart contact lens." IPCOM000255669D, IP.com, Oct. 8, 2018, 3 pages.

Singh et al., "A 21pJ/frame/pixel Imager and 34pJ/frame/pixel Image Processor for a Low-Vision Augmented-Reality Smart Contact Lens," IEEE Internat. Solid-State Circuits Conf. (ISSCC), Feb. 13, 2021, 3 pages.

Pandya et al., "Simultaneous augmented and virtual reality for surgical navigation," NAFIPS—2005 Annual Meeting of the North American Fuzzy Information Processing Society, 2005, 7 pages.

Liarokapis, "An augmented reality interface for visualizing and interacting with virtual content," Virtual Reality, 11:23-43, 2007, 21 pages.

Mell et al., "The NIST Definition of Cloud Computing", NIST, Special Publication 800-145, Sep. 2011, 7 pages.

Sherr, "You've heard of AR glasses, but this startup wants to make them into contact lenses", https://www.cnet.com/tech/mobile/youve-heard-of-ar-glasses-but-this-startup-wants-to-make-them-into-contact-lenses/, Nov. 14, 2018, 4 pages.

Tangermann, "DARPA: This Smart Contact Lens Could Give Soldiers Superpowers", https://futurism.com/darpa-augmented-reality-contact-lens, Apr. 29, 2019, 6 pages.

Anonymous, "Collaboration Solutions with IBM and Cisco", https://www.cisco.com/c/en/us/solutions/global-partners/ibm/collab-sol.html#~solutions, accessed Sep. 10, 2021, 7 pages.

* cited by examiner

COMBINING A VIRTUAL REALITY INTERFACE WITH A SMART CONTACT LENS USER INTERFACE

BACKGROUND

Aspects of the present invention relate generally to virtual reality and augmented reality systems and, more particularly, to combining a virtual reality interface with a smart contact lens augmented reality interface.

Augmented reality (AR) adds computer generated visual elements to a live view (e.g., a real-world view). AR is most typically achieved by the user looking through a transparent screen to obtain the live view, while the computer device displays visual elements on the transparent screen such that the visual elements are superimposed on the user's live view. Some smart contact lenses have AR capability in that they provide an AR user interface.

Virtual reality (VR) differs from AR in that VR does not use a live view. Instead, in VR, the user's vision is completely immersed in a computer-generated view. VR systems involve large headsets and/or glasses that block the entirety of the user's live view.

SUMMARY

In a first aspect of the invention, there is a computer-implemented method including: receiving, by a computing device, user input to move content from an augmented reality (AR) interface to a virtual reality (VR) interface; obtaining, by the computing device, security levels of users in a VR environment associated with the VR interface; determining, by the computing device and based on the security levels, which of the users in the VR environment is permitted to see the content; and changing, by the computing device, at least one of the AR interface to the VR interface based on the determining.

In another aspect of the invention, there is a computer program product including one or more computer readable storage media having program instructions collectively stored on the one or more computer readable storage media. The program instructions are executable to: receive user input to move content from an augmented reality (AR) interface of a smart contact lens to a virtual reality (VR) interface of a VR device, the smart contact lens and the VR device being worn by a same user; obtain security levels of users in a VR environment associated with the VR interface; determine, based on the security levels, which of the users in the VR environment is permitted to see the content; and change at least one of the AR interface to the VR interface based on the determining.

In another aspect of the invention, there is system including a processor, a computer readable memory, one or more computer readable storage media, and program instructions collectively stored on the one or more computer readable storage media. The program instructions are executable to: receive user input to move content from an augmented reality (AR) interface of a smart contact lens to a virtual reality (VR) interface of a VR device, the smart contact lens and the VR device being worn by a same user, and the AR interface being overlaid on the VR interface; obtain security levels of users in a VR environment associated with the VR interface, the security levels being defined in a separation of duties (SoD) matrix; determine, based on the security levels of the users and a security level of the content, which of the users in the VR environment is permitted to see the content; and change at least one of the AR interface to the VR interface based on the determining.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to virtual reality and augmented reality systems and, more particularly, to combining a virtual reality interface with a smart contact lens augmented reality interface. Implementations of the invention provide a combination of virtual reality (VR) interface from a headset and an augmented reality (AR) interface from a smart contact lens user interface. In embodiments, the user wears both the smart contact lens and VR device together to see a second user interface comprising the AR interface concurrently with a first interface comprising the VR interface. In embodiments, a security profile for the smart contact lens and the VR device can be changed based on need. In this manner, the user can perform content interaction between the smart contact lens and VR device.

In many situations, while interacting with VR system, a user might want to refer to a secondary computing system having a different security profile than that of the VR system. In such a situation, it would be advantageous for the user to maintain proper data security while interacting with VR system. For example, while the user is interacting with the VR system, the user might want to interact with a secondary computing system to identify which content can be transferred to the VR system. Implementations of the invention address this need by providing methods and systems that permit a user to interact with a secondary computing interface in the visual surrounding while simultaneously interacting with VR system.

A method in accordance with aspects of the invention includes: initiating a first interface and a second interface on a common user, wherein the first interface is that of a VR headset and the second interface is that of a smart contact lens, and wherein the first interface and second interface can have a different security profile (or the smart contact lens can have a personalized security profile, while the VR headset is a security profile based on all users in the VR); tracking, by the second interface, based on context of user's interaction in the first interface and by pairing with the first interface, what content is displayed in first interface and correlated content will be created by smart contact lens and the same will be overlaid over the VR content; and displaying content on the overlay of the second interface, wherein the displayed content is based on being restricted for the VR security profile, but not being restricted for the user's second interface security profile. In one example, the restricted content is a document. In this example, the file system location and the document can be overlayed on the second interface such that only the user can view the content. In this manner, implementations of the invention provide systems and methods for the coordinated use of smart contact lenses (used for AR) worn beneath a surrounding head-mounted display (e.g., a headset producing a multi-user VR related to the AR), with the lenses and the headsets having different security profiles so as to ensure that all of the VR users do not see the AR content.

In embodiments, while interacting within the VR environment, a user wears both the smart contact lens and the head-mounted VR device together. The smart contact lens and the VR device can have a same security profile or different security profiles, and can be controlled by different computing systems. Accordingly, based on the context of interaction of the user, the smart contact lens and VR device coordinate to create an appropriate overlaid user interface together from different the computing systems. In particular embodiments, both the smart contact lens and VR device create respective user interfaces individually using the two different computing systems. Based on a context of user interaction, the user can navigate from an AR object with the smart contact lens to VR content with the VR device.

Implementations may be used to provide a context-based overlay. In embodiments, the smart contact lens tracks content displayed in the VR device. The tracking may be based on a context of the user interaction. The tracking may be performed by pairing the smart contact lens with the VR device. The tracking may include tracking content that is displayed by the VR device, correlating content that is displayed by the smart contact lens, and overlaying the content displayed by the smart contact lens on the content displayed by the VR device. In embodiments, the system uses a historical corpus in generating the context-based overlay. In one example, based on a context of the interaction and also historical interaction with digital content, the system determines whether the smart contact lens and the VR device have a same security profile or different security profiles. In this manner, and based on the determined security profiles, the system displays appropriate content in each interface.

Implementations may be used to provide appropriate transfer of content between different user interfaces. In embodiments, when the smart contact lens and the VR device have different security profiles, the system may prevent a user from moving content from the AR interface to the VR interface. The system may require the user to provide an appropriate level of authentication to make such transfers of content from the AR interface to the VR interface. Embodiments may utilize continuous monitoring in this situation. In one example, the smart contact lens and the VR device communicate with each other to identify appropriate times when the smart contact lens content can be transferred from the AR interface to the VR interface.

It should be understood that, to the extent implementations of the invention collect, store, or employ personal information provided by, or obtained from, individuals (for example, personal and/or work security profile information, etc.) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (Saas): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
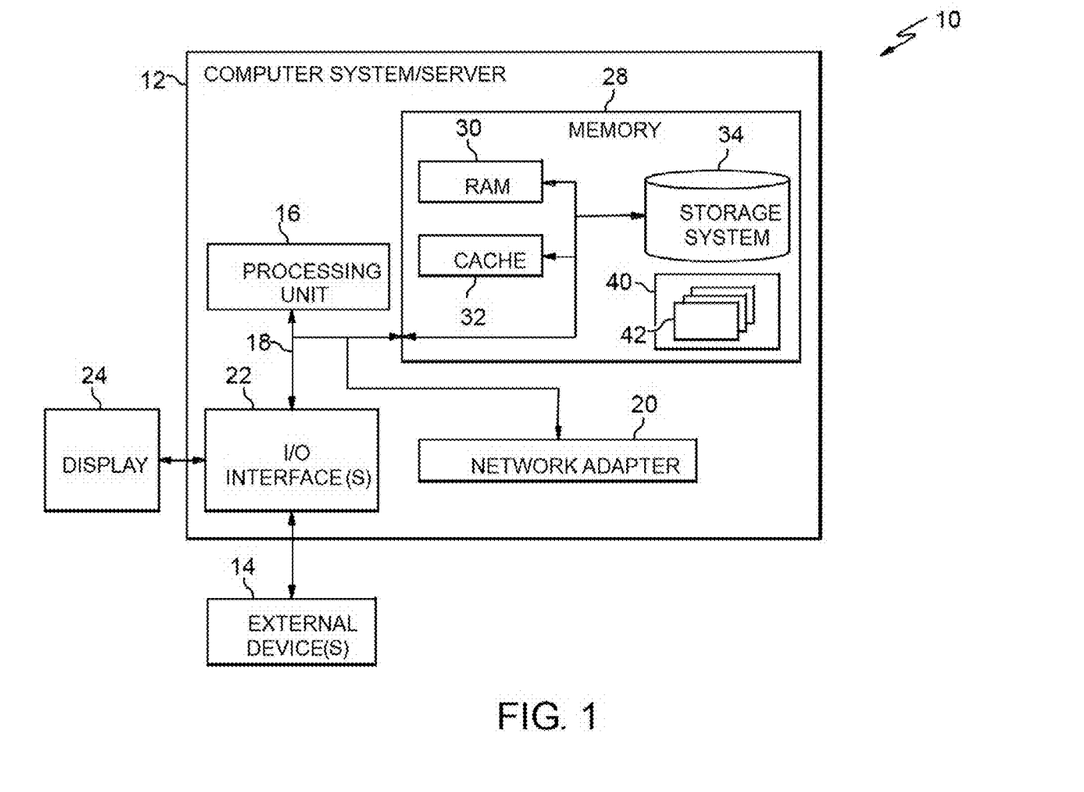
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
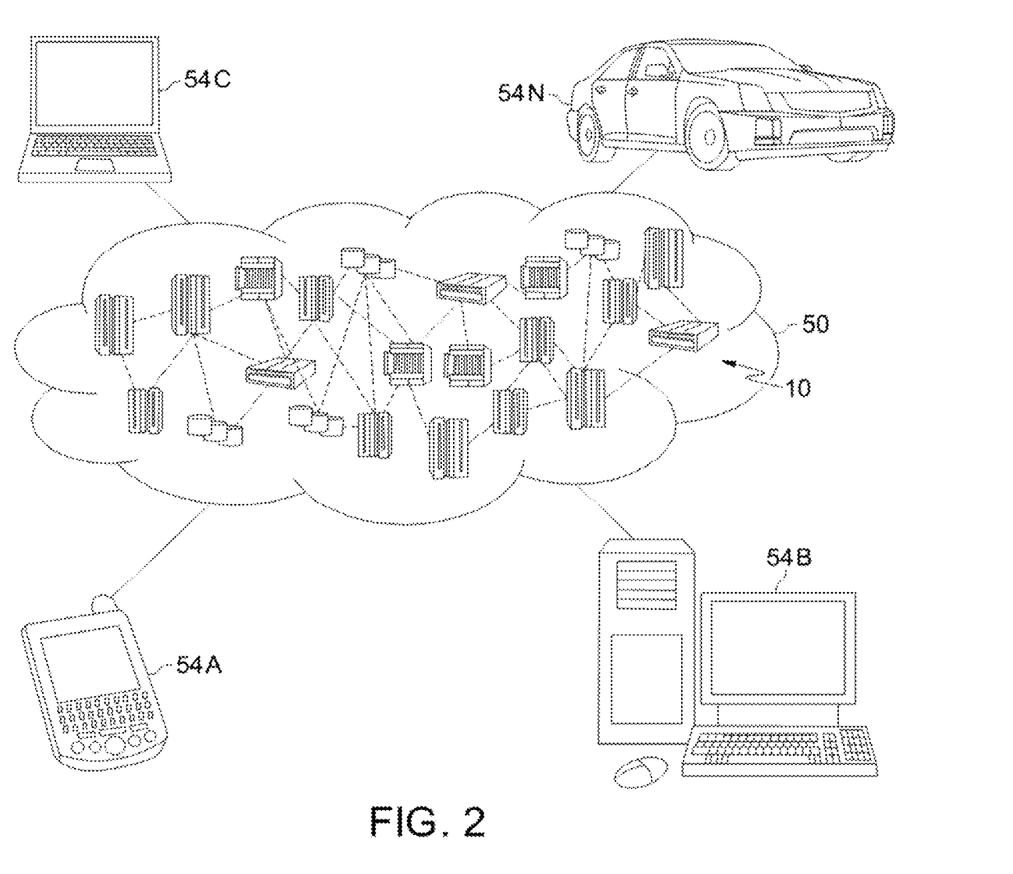
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
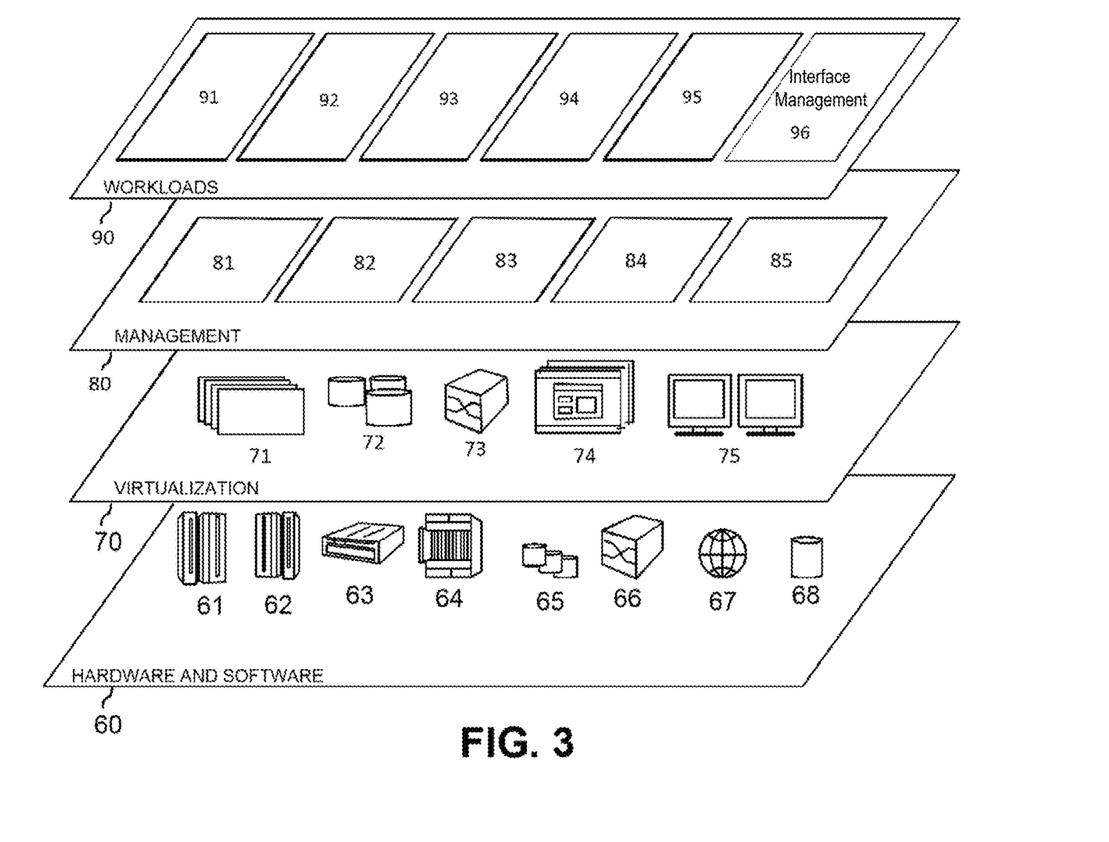
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interface management 96.

Implementations of the invention may include a computer system/server 12 of FIG. 1 in which one or more of the program modules 42 are configured to perform (or cause the computer system/server 12 to perform) one of more functions of the interface management 96 of FIG. 3. For example, the one or more of the program modules 42 may be configured to: receive user input to move content from an augmented reality (AR) interface of a smart contact lens to a virtual reality (VR) interface of a VR device, the smart contact lens and the VR device being worn by a same user, and the AR interface being overlaid on the VR interface; obtain security levels of users in a VR environment associated with the VR interface, the security levels being defined in a separation of duties (SoD) matrix; determine, based on the security levels of the users and a security level of the content, which of the users in the VR environment is permitted to see the content; and change at least one of the AR interface to the VR interface based on the determining.

Figure 4:
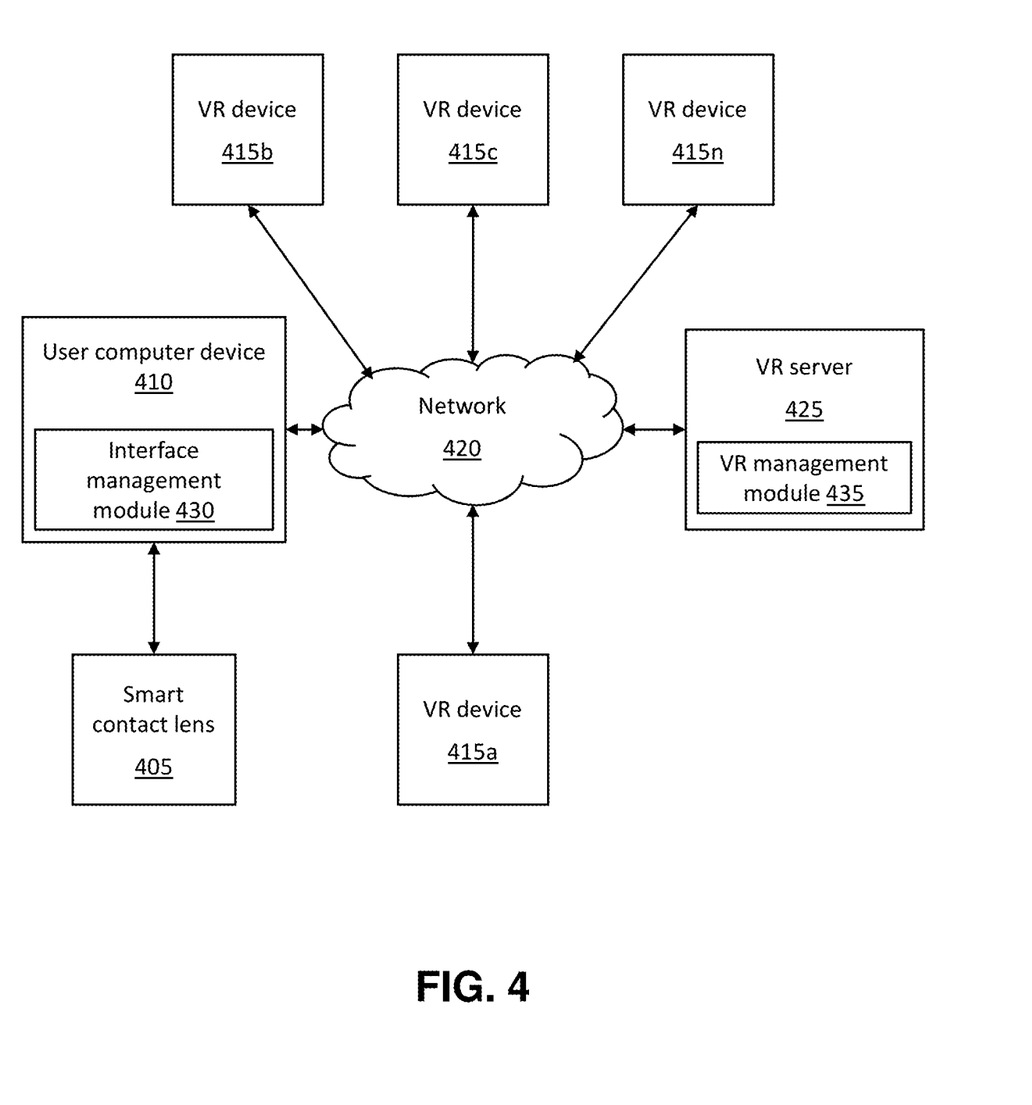
FIG. 4 shows a block diagram of an exemplary environment in accordance with aspects of the invention.

FIG. 4 shows a block diagram of an exemplary environment in accordance with aspects of the invention. In embodiments, the environment includes a smart contact lens 405, a user computer device 410, plural VR devices 415*a-n*, a network 420, and a VR server 425.

The smart contact lens 405 is structured and arranged to provide an AR user interface to a user wearing the smart contact lens 405 on their eye. In embodiments, the smart contact lens 405 includes a display layer, a control circuit, and a power supply. The smart contact lens 405 may include additional elements, for example additional layers, such as a transparent anterior layer and a transparent posterior layer, that form a flexible enclosure around the display layer, the control circuit, and the power supply.

In embodiments, the control circuit of the smart contact lens 405 comprises one or more antenna elements that are configured to provide wireless communication between the smart contact lens 405 and the user computer device 410, such as a mobile device of a wearer of the smart contact lens 405. In this manner, the user computer device 410 may provide control signals and other information to the smart contact lens 405.

In accordance with aspects of the invention, the display layer of the smart contact lens 405 is a layer that is normally transparent and that is configured to display visual content to a wearer of the smart contact lens 405. In embodiments, the display layer comprises a micro display, such as a high resolution microLED display, for example. In embodiments, the display layer is operatively connected to the control circuit, such that the control circuit provides control signals to the display layer that cause the display layer to show content defined by the control signals (e.g., by selectively energizing individual pixels of the display layer). In this manner, the display layer is controlled to display visual content (e.g., text, shapes, colors, pictures, video, etc.) to a user wearing the smart contact lens 405. Due to the transparency of the portions of the display layer that are not displaying content, the smart contact lens 405 creates an AR user interface by superimposing the visual content that is displayed on the display layer onto the user's live view that is seen through the transparent portions of the display layer.

The user computer device 410 is a computing device that comprises one or more elements of computer system 12 of FIG. 1. The user computer device 410 may be a computing device such as a smartphone, tablet computer, laptop computer, or desktop computer, for example. In embodiments, the user computer device 410 communicates with the smart contact lens 405 via local wireless communication such as Wi-Fi, Bluetooth, Near Field Communication, etc. The user computer device 410 may also communicate with the network 420 via a network interface. The user computer device 410 may also communicate with the VR device 415*a* via the network 420 or via local wireless communication such as Wi-Fi, Bluetooth, Near Field Communication, etc.

The network 420 is any suitable combination of communication networks. For example, the network 420 may comprise one or more of a LAN, WAN, and the Internet.

Each of the VR devices 415*a-n* is a head-mounted device that provides a VR interface to a wearer of the device. For example, each of the VR devices 415*a-n* may be a VR headset. Each VR device 415*a-n* may comprise a stereoscopic head-mounted display (providing separate images for each eye), one or more loudspeakers for emitting sound, and head-motion-tracking sensors, which may include devices such as gyroscopes, accelerometers, magnetometers, or structured light systems. Each VR device 415*a-n* may include one or more elements of computer system 12 of FIG. 1, such as a processing unit, network adapter, and memory. Each VR device 415*a-n* may include a client application (e.g., software) that uses information received from the VR server 425 to generate the VR interface that the VR device displays to the wearer of the VR device.

The VR server 425 is a computing device that comprises one or more elements of computer system 12 of FIG. 1. In embodiments, the VR server 425 functions as a host for the VR environment that is displayed by the VR devices 415*a-n*. For example, the VR server 425 may receive data from each of the VR devices 415*a-n* in real time (or near real time), the data defining actions performed by the users in the VR environment (e.g., movements, inputs, etc.). Based on this data, the VR server 425 may send control signals to the VR devices 415*a-n* so that the interface displayed in each of the VR devices 415*a-n* is updated in real time (or near real time) to accurately reflect the actions that other users perform in the VR environment.

In embodiments, the user computer device 410 comprises an interface management module 430 and the VR server 425 comprises a VR management module 435. Each of the modules 430, 435 may comprise one or more program modules such as program modules 42 described with respect to FIG. 1. The user computer device 410 and the VR server 425 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In accordance with aspects of the invention, a first user utilizes the smart contact lens 405, the user computer device 410, and the VR device 415*a*, while other users utilize the VR devices 415*b-n*. In embodiments, the smart contact lens 405 is paired with the user computer device 410, and the first user wears the smart contact lens 405 on their eye concurrently with wearing the VR device 415*a* on their head. In this manner, the first user sees the display of an AR interface generated by the smart contact lens 405 overlaid on the display of a VR interface generated by the VR device 415*a*. In embodiments, the AR interface generated by the smart contact lens 405 is seen only by the first user wearing the smart contact lens 405, whereas the VR interface generated by the VR device 415*a* is a representation of a VR environment that is shared by other users wearing the other VR devices 415*b-n*. In embodiments, at least the first user opts-in to using the system for managing the overlaid AR and VR interfaces.

In some embodiments, the smart contact lens 405 communicates with the VR device 415*a*. The communication is wireless, and may use protocols such as Bluetooth, Wi-Fi, etc. As noted herein, the smart contact lens 405 and the VR device 415*a* are controlled by different computing systems and receive content from different sources. For example, the smart contact lens 405 has control circuitry that receives content and instructions from the user computer device 410, while the VR device 415*a* is controlled by self-contained hardware and receives content from the VR server 425.

In accordance with aspects of the invention, because the smart contact lens 405 and the VR device 415*a* have different content sources, the smart contact lens 405 and the VR device 415*a* may have different security profiles that define what content to the user is permitted to see in each interface. For example, the user wearing the smart contact lens 405 and the VR device 415*a* may have a first security profile that applies to content displayed by the smart contact lens 405 and a second security profile that applies to content displayed by the VR device 415*a*. Moreover, because the smart contact lens 405 and the VR device 415*a* are controlled by different computing systems, the controlling of content displayed by the smart contact lens 405 is performed independently of the controlling of content displayed by the VR device 415*a*. As described herein, the content displayed by the smart contact lens 405 differs from the content displayed by the VR device 415*a* such that, from the perspective of the user wearing both the smart contact lens 405 and the VR device 415*a*, the interface displayed by the smart contact lens 405 is overlaid on the interface displayed by the VR device 415*a*.

In embodiments, while the user is interacting with both devices, the smart contact lens 405 gathers information from the VR device 415*a* to determine what content is being displayed by the VR device 415*a*. For example, when the smart contact lens 405 is paired with the VR device 415*a*, the smart contact lens 405 may use this pairing to obtain information that defines the content in the VR environment displayed by the VR device 415*a*. In embodiments, the smart contact lens 405 (or the user computer device 410) uses this information to determine what content to display on the smart contact lens 405.

The system analyzes security profiles, in embodiments, to determine whether a same security profile or a different security profile is required for the smart contact lens 405 and the VR device 415*a*. In embodiments, this determination is made based on the content that is being displayed by the VR device 415*a*. In one example, having the different security profiles for the smart contact lens 405 and the VR device 415*a* permits controlling (e.g., selectively allowing or preventing) content sharing from the AR interface to the VR interface.

In embodiments, the system performs a monitoring function with respect to the content and security profiles. In one example, both the smart contact lens 405 and the VR device 415*a* track the user's interaction with the combined user interface, and the smart contact lens 405 displays only appropriate content based on this tracking. In embodiments, in the event that no information is present on certain members in the VR environment displayed by the VR device 415*a*, then the system prompts (e.g., asks) the user what security level to use for such members.

In accordance with aspects of the invention, the system controls moving files from one interface to the other (e.g., from that of the smart contact lens 405 to that of the VR device 415*a*) based on the security profiles. In one example, based on the selection of a security profile in the smart contact lens 405 and the VR device 415*a*, the system allows the user to move a file from the interface of the smart contact lens 405 to that of the VR device 415*a*. In this example, the file is visible only to the user of the smart contact lens 405 when the file is displayed in the interface of the smart contact lens 405; however, when the user moves the file to the interface of the VR device 415*a*, the file is then visible to other users in the VR environment that have a respective security profile that permits viewing the file.

In embodiments, the system visually shows moving files. In one example, when the user provides input to move a file from the interface of the smart contact lens 405 to that of the VR device 415*a*, the smart contact lens 405 to that of the VR device 415*a* coordinate their respective displays to visually show the file moving from one location to another. This coordination may be accomplished using the pairing described herein.

Figure 5A:
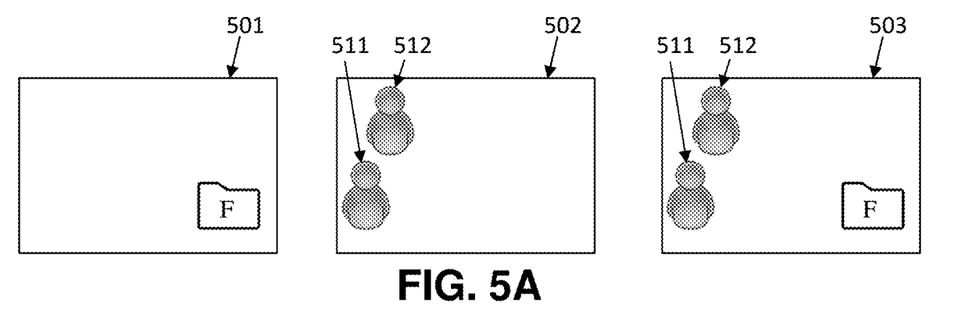
FIGS. 5A-D show examples of use in accordance with aspects of the invention.

FIGS. 5A-D shows examples of use in accordance with aspects of the invention. FIG. 5A shows an AR interface 501 displayed by the smart contact lens 405 (of FIG. 4) and a VR interface 502 displayed by the VR device 415*a* (of FIG. 4). As described herein, a user wears both the smart contact lens 405 and the VR device 415*a* at the same time, with the result being that the user sees the display shown in box 503 which includes the display of the AR interface 501 overlaid on the display of the VR interface 502. As shown in FIG. 5A, the AR interface 501 includes content in the form of a file labeled "F" in this example. Also in this example, the VR interface 502 shows representations 511, 512 of two users in the VR environment. The representations 511, 512 are of users wearing VR devices 415*b*, 415*c* (of FIG. 4), with the user wearing VR device 415*a* and the users wearing VR devices 415*b*, 415*c* all being in the same VR environment. The examples shown in FIG. 5A-D are described using the file F as the content being moved from the AR interface to the VR interface; however, embodiments are not limited to use with files, and other types of content may be used.

In the example depicted in FIG. 5A, the user wearing VR device 415*b* sees in their VR display (not shown) a representation of the user wearing VR device 415*a* and a representation of the user wearing VR device 415*c*. In this example, the user wearing VR device 415*b* does not see the file F since that content is not in the VR environment, and instead at the time of FIG. 5A is only in the AR environment of the user wearing the smart contact lens 405 and the VR device 415*a*.

Similarly, in the example depicted in FIG. 5A, the user wearing VR device 415*c* sees in their VR display (not shown) a representation of the user wearing VR device 415*a* and a representation of the user wearing VR device 415*b*. In this example, the user wearing VR device 415*c* also does not see the file F since that content is not in the VR environment, and instead at the time of FIG. 5A is only in the AR environment of the user wearing the smart contact lens 405 and the VR device 415*a*.

Figure 5B:
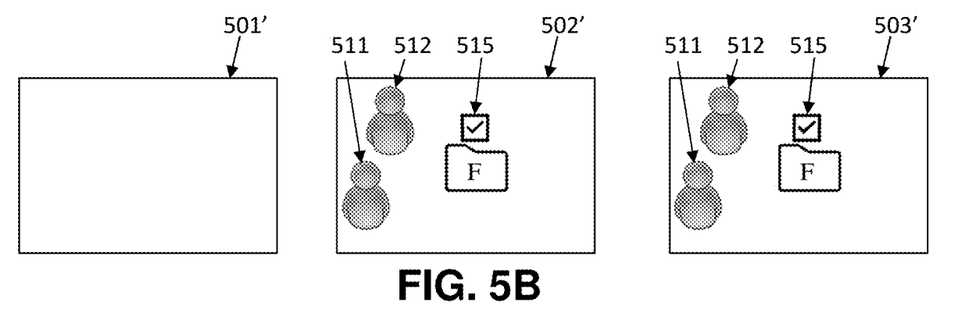
Figure 5C:
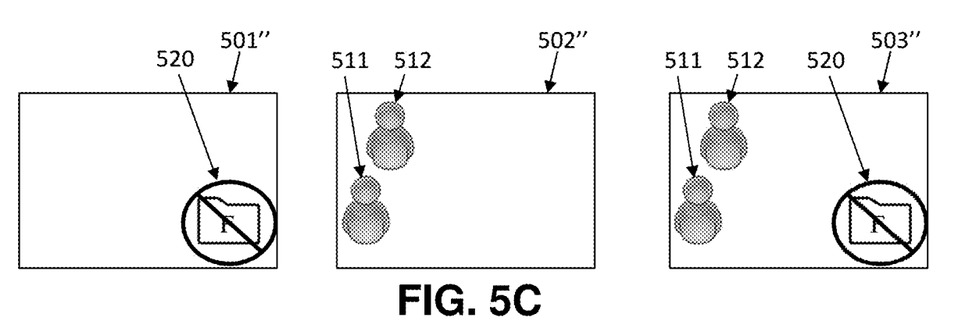
Figure 5D:
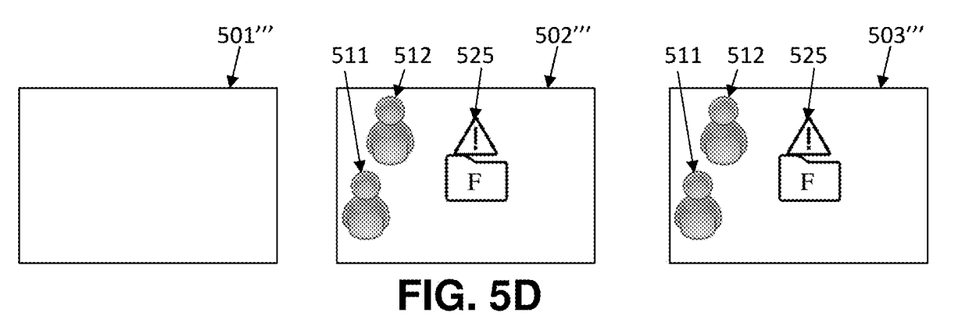

FIGS. 5B, 5C, 5D show different outputs of the smart contact lens 405 and the VR device 415*a*, after the initial display shown in FIG. 5A and in response to the user providing input to move the file F (of FIG. 5A) into the VR environment. The different outputs shown in FIGS. 5B, 5C, 5D are the result of different security determinations made based on a security level of the file F and security profiles for the users depicted by representations 511, 512. As described herein, the security determinations are made by either the user computer device 410 or the VR server 425 (both of FIG. 4).

In the example shown in FIG. 5B, each of the users depicted by representations 511, 512 has a security profile that allows those users to see the file F. In embodiments, in response to the user wearing the smart contact lens 405 and the VR device 415*a* providing input to move the file F from the AR interface into the VR interface, the system determines whether each user in the VR environment is allowed to see the file F. The user input to move the file F may be any suitable input, such as a voice command, hand gesture, or other input received by the user computer device 410 (of FIG. 4).

With continued reference to FIG. 5B, in response to receiving the user input to move the file F from the AR interface into the VR interface, the user computer device 410 compares the security level of the file F to the security profile of each user in the VR environment. In embodiments, the interface management module 430 of the user computer device 410 obtains the security level of the file F from the file itself or from data stored in the user computer device 410. Data defining the security level of the file F is readily obtainable by the user computer device 410 because the user computer device 410 provides the file F to the smart contact lens 405 in the first place.

In embodiments, the interface management module 430 of the user computer device 410 obtains data defining a security profile of each user in the VR environment from the VR server 425 (of FIG. 4). In one example, the VR server 425 stores (or has access to) a respective security profile for each user in the VR environment, where each security profile includes data that defines one or more predefined security levels that this user is allowed to see. In this example, the file F is also tagged with one of the predefined security levels. The interface management module 430 of the user computer device 410 determines which users in the VR environment are permitted to see the file F by comparing the security level of the file F to the security level(s) permitted for each user in the VR environment. As a simple and non-limiting example, the predefined security levels include minimum, medium, and maximum. In this example, the user associated with representation 511 has a security profile that defines this user as being allowed to view content having a security level of minimum, and the user associated with representation 512 has a security profile that defines this user as being allowed to view content having a security level of either minimum or medium. Continuing this example, data (e.g., metadata) associated with the file F defines a security level of the file F as minimum. In this example, the interface management module 430 determines that both users associated with representation 511, 512 are permitted to see the file F because both users have a security level defined in their security profile the equals or exceeds the security level of the file F.

In embodiments, the security levels of the users are defined in a Separation of Duties (SoD) matrix stored by the VR server 425. In one example, the SoD matrix is a data structure that defines the respective security levels for plural different users associated with a group (e.g., an enterprise, a working group, etc.). In this manner, the user computer device 410 may access the SoD matrix stored by the VR server 425 when the interface management module 430 determines which users in the VR environment are permitted to see the file F.

Still referring to FIG. 5B, in response to receiving the user input to move the file F from the AR interface into the VR interface and based on determining that all users in the VR environment are allowed to see the file F, the system changes the display of the smart contact lens 405 and the VR device 415*a* to show the file F as moved from the AR interface to the VR interface. As a result, as shown in FIG. 5B, the AR interface 501' no longer shows the file F, and the VR interface 502' shows the file F, with the combined display shown in box 503'.

In embodiments, the interface management module 430 of the user computer device 410 causes the smart contact lens 405 to change its display, e.g., by sending one or more control signals to the smart contact lens in the manner already described herein. In embodiments, the interface management module 430 of the user computer device 410 or the smart contact lens 405 causes the VR device 415*a* to change its display. In one example, the interface management module 430 sends instruction to the VR device 415*a* to change its display (e.g., to that shown in FIG. 5B) by communication via the network or via pairing between the user computer device 410 and the VR device 415*a*. In another example, the smart contact lens 405 sends instruction to the VR device 415*a* to change its display (e.g., to that shown in FIG. 5B) by communication via pairing between the smart contact lens 405 and the VR device 415*a*. In another example, the interface management module 430 sends instruction to the VR server 425 notifying the VR server 425 of the file F and its location in the VR environment. In this last example, the VR management module 435 of the VR server 425 sends data to each VR device 415*a-n* that causes each VR device to update its display to show the file F at the indicted location in the VR environment.

Still referring to the example shown in FIG. 5B, the other users in the VR environment can see and interact with the file F after the file F is moved to the VR environment. For example, the user wearing VR device 415*b* sees in their VR display (not shown) a representation of the file F and this user may then interact with the file as they would with other objects in the VR environment. For example, the user might view the contents of the file F, edit the file F, or save the file F to their local or cloud storage.

In embodiments, the system visually shows movement of the content (e.g., the file F) when the content is moved to the VR interface. In the example shown in FIGS. 5A and 5B, the file F is initially shown in the bottom right corner of the AR interface 501 (of FIG. 5A) and, after being moved to the VR interface, the file F is shown in the center of the VR interface 502' (of FIG. 5B). This is one example, and other techniques may be used to visually show movement of the content from one interface to the other interface.

In embodiments, the system shows an indicator that the file F is allowed to be seen by all users in the VR environment. In the example shown in FIGS. 5A and 5B, the file F is initially shown with an icon (e.g., a folder) in the AR interface 501 (of FIG. 5A) and, after being moved to the VR interface, the file F is shown with its original icon and an additional indicator 515 (e.g., a check mark) in the VR interface 502' (of FIG. 5B). This is one example, and other visual techniques may be used to show that the file F is allowed to be seen by all users in the VR environment.

In the example shown in FIG. 5C, at least one of the users depicted by representations 511, 512 has a security profile that does not allow the user to see the file F. In this example, the user associated with representation 511 has a security profile that defines this user as being allowed to view content having a security level of minimum, and the user associated with representation 512 has a security profile that defines this user as being allowed to view content having a security level of either minimum or medium. Continuing this example, data associated with the file F defines a security level of the file as medium. In this example and based on these security levels, the interface management module 430 of the user computer device 410 determines that the user associated with representation 511 is not permitted to see the file F and the user associated with representation 512 is permitted to see the file F.

Still referring to FIG. 5C, in response to receiving the user input to move the file F from the AR interface into the VR interface and based on determining that at least one of the users in the VR environment is not permitted to see the file F, the system prevents moving the file F from the AR interface into the VR interface. As a result, as shown in FIG. 5C, the AR interface 501" still shows the file F, and the VR interface 502" does not show the file F.

In embodiments, the system shows an indicator that the file F is not moved to the VR environment. In the example shown in FIGS. 5A and 5C, the file F is initially shown with an icon (e.g., a folder) in the AR interface 501 (of FIG. 5A) and, after not being moved to the VR interface, the file F is shown with its original icon and an additional indicator 520 (e.g., a circle with a diagonal slash) in the AR interface 501" and the combined display 503" (of FIG. 5C). This is one example, and other visual techniques may be used to show that the file F is not allowed to be moved into the VR environment.

FIG. 5D shows an alternate method for handling the situation when at least one user in the VR environment has a security profile that allows them to see the file F and at least one other user in the VR environment has a security profile that does not allow them to see the file F. Previously, FIG. 5C showed an example in which the system prevents moving the file F to the VR environment when any user in the VR environment is not permitted to see the file. FIG. 5D, in contrast to FIG. 5C, shows an example in which the file F can still be moved to the VR environment when at least one user in the VR environment is not permitted to see the file F and at least one user in the VR environment is permitted to see the file F.

In the example shown in FIG. 5D, the user associated with representation 511 has a security profile that defines this user as being allowed to view content having a security level of minimum, and the user associated with representation 512 has a security profile that defines this user as being allowed to view content having a security level of either minimum or medium. Continuing this example, data associated with the file F defines a security level of the file as medium. In this example and based on these security levels, the interface management module 430 of the user computer device 410 determines that the user associated with representation 511 is not permitted to see the file F and the user associated with representation 512 is permitted to see the file F.

Still referring to FIG. 5D, in response to receiving the user input to move the file F from the AR interface into the VR interface and based on determining that at least one user in the VR environment is not allowed to see the file F and at least one user in the VR environment is allowed to see the file F, the system changes the display of the smart contact lens 405 and the VR device 415a to show the file F as moved from the AR interface to the VR interface. As a result, as shown in FIG. 5D, the AR interface 501''' no longer shows the file F, and the VR interface 502''' shows the file F, with the combined display shown in box 503'''.

In embodiments, the interface management module 430 of the user computer device 410 sends instruction to the VR server 425 notifying the VR server 425 of the file F and its location in the VR environment and of which users are allowed to see the file F and which users are not allowed to see the file F. In embodiments, in response to receiving this instruction from the user computer device 410, the VR management module 435 of the VR server 425 sends data to the VR devices of users that are allowed to see the file that cause those VR devices to update their display to show the file F at the indicted location in the VR environment. In embodiments, in response to receiving this instruction from the user computer device 410, the VR server 425 does not send data to the VR devices of the users that are not allowed to see the file F. In this manner, users that are permitted to see the file F will see and interact with the file F in their VR display, while users that are not permitted to see the file F will not see the file F in their VR display.

In another example, in response to receiving the instruction from the user computer device 410 of which users are allowed to see the file F and which users are not allowed to see the file F, the VR server 425 sends data to the VR devices of all the users to cause the all the VR devices to update their display to show the file F at the indicted location in the VR environment. In this example, the users that are permitted to see the file can interact with the file F. e.g., open the file and view its contents, edit the contents, save the file, etc. In this example, the suers that are not permitted to see the file F can see an icon representing the file in their VR display, but they cannot interact with the file (e.g., the VR server 425 prevents these users from opening the file and viewing its contents, editing the contents, saving the file, etc. In this manner, all the user see the file in the VR environment, but only a subset of the users a permitted to interact with the file.

In embodiments, the system shows an indicator that the file F is allowed to be seen by some but not all users in the VR environment. In the example shown in FIGS. 5A and 5D, the file F is initially shown with an icon (e.g., a folder) in the AR interface 501 (of FIG. 5A) and, after being moved to the VR interface, the file F is shown with its original icon and an additional indicator 525 (e.g., a caution sign) in the VR interface 502''' (of FIG. 5B). This is one example, and other visual techniques may be used to show that the file F is allowed to be seen by some but not all users in the VR environment.

As described herein, FIGS. 5C and 5D show different methods for handling the situation when at least one user in the VR environment has a security profile that allows them to see the file F and at least one other user in the VR environment has a security profile that does not allow them to see the file F. Consistent with both FIGS. 5C and 5D, when no users in the VR environment are permitted to see the file, then the system prevents moving the file (e.g., similar to that depicted in FIG. 5C).

FIGS. 5B-D have been described thus far with respect to an embodiment in which the interface management module 430 of the user computer device 410 determines whether the various users in the VR environment are permitted to see content before that content is moved from an AR interface to a VR interface. In another embodiment, the VR management module 435 of the VR server 425 makes this determination using data received from the user computer device 410. In this embodiment, the user computer device 410 transmits to the VR server 425 data that defines the security level of the file F. Upon receiving the security level of the file F, the VR server 425 determines which users currently in the VR environment are permitted to see the file F, e.g., by comparing the security level of the file to the respective security level(s) of each user currently in the VR environment. In this example, the VR server 425 returns the result of the determining to the user computer device 410, which then proceeds to provide instructions to move or not move the file F in the manner described with respect to one of FIGS. 5B-D. In this embodiment, in instances when the user computer device 410 provides instructions to move the file F (e.g., as in FIG. 5B or 5D) based on the VR server 425 determining which users are permitted to see the file F, the user computer device 410 also notifies the VR server 425 so that the VR server 425 can send instructions to the other VR devices (e.g., one or more of VR devices 415b-n) to show the file F in their respective VR interface, e.g., in the manner already described herein.

Figure 6:
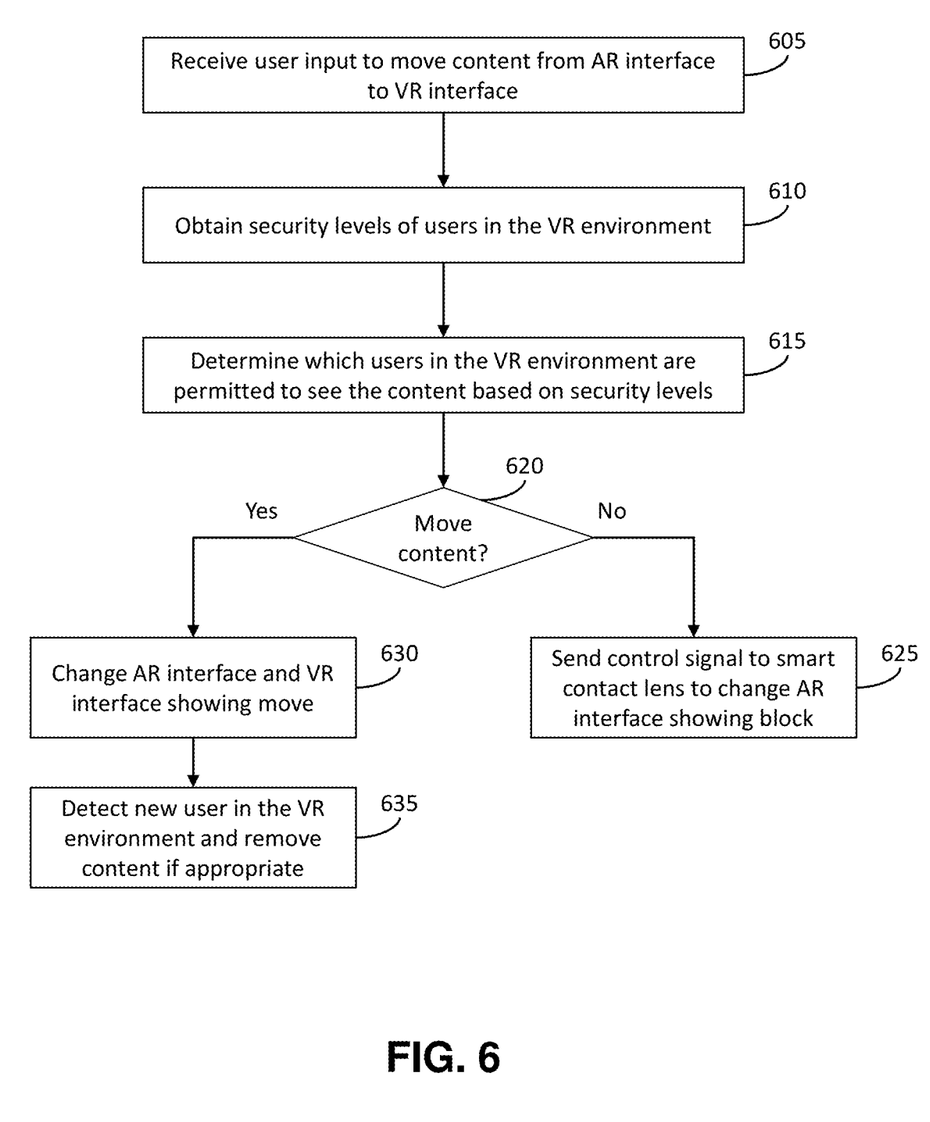
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4 and according to the examples in FIGS. 5A-D.

At step 605, the system receives user input to move content from an AR interface to a VR interface. In embodiments, and as described with respect to FIG. 5A, a user is wearing both a smart contact lens 405 and a VR device 415a, and the user provides input to move content (e.g., file F) from the AR interface of the smart contact lens 405 to the VR interface of the VR device 415a. In embodiments, the user computer device 410 receives the user input at step 605.

At step 610, the system obtains security levels of all other users on the VR environment. In embodiments, and as described with respect to FIGS. 5B-D, the user computer device 410 obtains the security levels of the users from the VR server 425, which continuously tracks which users are currently in the VR environment. In embodiments, step 610 includes the user computer device 410 obtaining the security level data by communicating with the VR server 425 using the network 420 and network communication such as HTTP request, etc. In embodiments, the security levels are defined in an SOD matrix that is stored at (or accessed by) the VR server 425.

At step 615, the system determines which users in the VR environment are permitted to see the content that was requested to be moved at step 605. In embodiments, and as described with respect to FIGS. 5B-D, the user computer device 410 compares a security level of the content to the respective security levels of each of the users as obtained at step 610 and, based on this comparing, the user computer device 410 determines which users are permitted to see the content.

At step 620, the system determines whether to move the content. In embodiments, the user computer device 410 uses predefined rules and the results of the determination at step 615 to determine whether to move the content from the AR interface to the VR interface. One example of a rule is that the user computer device 410 determines to move the content based on all the users in the VR environment being permitted to see the content (e.g., as described at FIG. 5B). Another example of a rule is that the user computer device 410 determines to not move the content based on all of the users in the VR environment not being permitted to see the content. Another example of a rule is that the user computer device 410 determines to not move the content based on at least one of the users in the VR environment not being permitted to see the content (e.g., as described at FIG. 5C). Another example of a rule is that the user computer device 410 determines to move the content only for users in the VR environment that are permitted to see the content, and to not move the content for users that are not permitted to see the content (e.g., as described at FIG. 5D). Another example of a rule is that the user computer device 410 determines to move the content for all users in the VR environment but to limit which users can interact with the content in the VR environment (e.g., as described at FIG. 5D).

In the event that the system determines to not move the content at step 620, then at step 625 the system changes the AR interface to show that the move was blocked. In embodiments, and as described with respect to FIG. 5C, the user computer device 410 sends one or more control signals to the smart contact lens 405 to cause the smart contact lens 405 to change its display in a manner that indicates to the user that the requested move was blocked (e.g., prevented).

In the event that the system determines to move the content at step 620, then at step 630 the system changes the AR interface and the VR interface to show that the move occurred. In embodiments, and as described with respect to FIG. 5B or FIG. 5D, the user computer device 410 changes the AR interface by sending one or more control signals to the smart contact lens 405 to cause the smart contact lens 405 to change its display in a manner that indicates to the user that the requested move occurred. As a result, the file is no longer displayed in the AR interface.

With continued reference to step 625, in one embodiment, and as described with respect to FIG. 5B or FIG. 5D, the user computer device 410 changes the VR interface of the VR device 415a by sending one or more control signals to the VR device 415a to cause the VR device 415a to change its display in a manner that indicates to the user that the requested move occurred. As a result, the file is displayed in the VR interface.

With continued reference to step 625, in one embodiment, and as described with respect to FIG. 5B or FIG. 5D, the user computer device 410 changes the VR interface of plural ones of the VR devices 415a-n by sending data to the VR server 425, the data defining the move of the content into the VR environment. Based on the receiving this data, the VR server sends data to the plural ones of the VR devices 415a-n that causes the plural ones of the VR devices 415a-n to change their display to show the content.

At step 635, the system detects a new user in the VR environment. In embodiments, the user computer device 410 periodically polls the VR server 425 to request data defining which users are in the VR environment. The user computer device 410 compares this data to data defining which users were in the VR environment when the content was moved, and determines if any new users have entered the VR environment based on this comparing. When the user computer device 410 determines that a new user has entered the VR environment where the content is displayed, the user computer device 410 determines whether the new user is permitted to see the content (e.g., by comparing the new user's security level to the security level of the content). If the new user is permitted to see the content, then the system leaves the content in the VR environment. If the new user is not permitted to see the content, the system removes the content from the VR environment. In one example, the user computer device 410 sends an instruction to the VR server 425 to remove the content from the VR environment.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computing device, user input to move content from an augmented reality (AR) interface generated and displayed by a smart contact lens worn by a user to a virtual reality (VR) interface generated and displayed by a VR headset worn by the user concurrently with the smart contact lens;
    obtaining, by the computing device, security levels of users in a VR environment associated with the VR interface;
    determining, by the computing device and based on the security levels, which of the users in the VR environment is permitted to see the content; and
    changing, by the computing device, at least one of the AR interface to the VR interface based on the determining.

2. The method of claim 1, wherein the AR interface generated and displayed by the smart contact lens is overlaid on the VR interface generated and displayed by the VR headset, such that the user sees a display of the AR interface generated by the smart contact lens overlaid on a display of the VR interface generated by the VR headset.

3. The method of claim 1, wherein:
    the determining includes determining that all the users in the VR environment are permitted to see the content; and
    the changing comprises: changing the AR interface to not show the content; and changing the VR interface to show the content in the VR environment.

4. The method of claim 3, further:
comprising detecting a new user in the VR environment; and
determining to leave the content in the VR environment or remove the content from the VR environment based on a security level of the new user.

5. The method of claim 1, wherein:
the determining includes determining that all the users in the VR environment are not permitted to see the content; and
the changing comprises changing the AR interface to show that the content was not moved.

6. The method of claim 1, wherein the determining includes determining that at least one of the users in the VR environment is permitted to see the content and at least one other of the users in the VR environment is not permitted to see the content.

7. The method of claim 1, wherein the computing device is a user computer device that is paired with the smart contact lens the displays the AR interface.

8. The method of claim 1, wherein the obtaining the security levels of the users in the VR environment comprises:
determining that security information is not available for at least one of the users in the VR environment; and
prompting the user to provide input to define a security level for the at least one of the users in the VR environment for which security information is not available.

9. The method of claim 1, wherein the smart contact lens and the VR headset have different security levels while being worn concurrently by the user.

10. The method of claim 3, wherein:
the content is shown with a first icon in the AR interface; and
after being moved to the VR interface, the content is shown in the VR interface with the first icon and an additional indicator that indicates all the users in the VR environment are permitted to see the content.

11. A computer program product comprising one or more computer readable storage media having program instructions collectively stored on the one or more computer readable storage media, the program instructions executable to:
receive user input to move content from an augmented reality (AR) interface generated and displayed by a smart contact lens to a virtual reality (VR) interface generated and displayed by a VR device, the smart contact lens and the VR device being worn concurrently by a same user;
obtain security levels of users in a VR environment associated with the VR interface;
determine, based on the security levels, which of the users in the VR environment is permitted to see the content; and
change at least one of the AR interface to the VR interface based on the determining.

12. The computer program product of claim 11, wherein the AR interface is overlaid on the VR interface.

13. The computer program product of claim 11, wherein:
the determining includes determining that all the users in the VR environment are permitted to see the content; and
the changing comprises: changing the AR interface to not show the content; and changing the VR interface to show the content in the VR environment.

14. The computer program product of claim 13, further:
comprising detecting a new user in the VR environment; and
determining to leave the content in the VR environment or remove the content from the VR environment based on a security level of the new user.

15. The computer program product of claim 11, wherein:
the determining includes determining that all the users in the VR environment are not permitted to see the content; and
the changing comprises changing the AR interface to show that the content was not moved.

16. A system comprising:
a processor, a computer readable memory, one or more computer readable storage media, and program instructions collectively stored on the one or more computer readable storage media, the program instructions executable to:
receive user input to move content from an augmented reality (AR) interface of a smart contact lens to a virtual reality (VR) interface of a VR device, the smart contact lens and the VR device being worn concurrently by a same user, and the AR interface being overlaid on the VR interface;
obtain security levels of users in a VR environment associated with the VR interface, the security levels being defined in a separation of duties (SoD) matrix;
determine, based on the security levels of the users and a security level of the content, which of the users in the VR environment is permitted to see the content; and
change at least one of the AR interface to the VR interface based on the determining.

17. The system of claim 16, wherein the program instructions executable to obtain the SoD matrix from a VR server running the VR environment, and wherein the SoD matrix comprises a data structure that defines the respective security levels for plural different users associated with a group.

18. The system of claim 17, wherein:
the VR device comprises a headset including a stereoscopic head-mounted display that displays the VR interface;
the smart contact lens displays the AR interface;
the smart contact lens and the headset worn concurrently by the same user have different security levels; and
the changing the VR interface comprises sending data to the VR server that causes the VR server to instruct the VR device to change the VR interface.

19. The system of claim 17, wherein the changing the VR interface comprises sending data to the VR server that causes the VR server to instruct the VR device to display the content with an icon that indicates all of the users are permitted to view the content.

20. The system of claim 17, wherein the changing the VR interface comprises sending data to the VR server that causes the VR server to instruct the VR device to display the content with an icon that indicates not all of the users are permitted to view the content.

* * * * *